United States Patent
Sharma et al.

(10) Patent No.: US 12,498,876 B2
(45) Date of Patent: Dec. 16, 2025

(54) PERFORMING DISTRIBUTED PROCESSING USING DISTRIBUTED MEMORY

(71) Applicant: Intel Corporation, Santa Clara, CA (US)

(72) Inventors: Abhishek Anil Sharma, Portland, OR (US); Pushkar Ranade, San Jose, CA (US); Sagar Suthram, Portland, OR (US); Wilfred Gomes, Portland, OR (US); Rajabali Koduri, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 17/850,090

(22) Filed: Jun. 27, 2022

(65) Prior Publication Data

US 2023/0418508 A1    Dec. 28, 2023

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,490,279 B1 * | 12/2002 | Chen | H04L 12/56 711/216 |
| 2021/0074695 A1 | 3/2021 | Gomes et al. | |
| 2021/0225808 A1 | 7/2021 | Bohr et al. | |
| 2021/0375849 A1 | 12/2021 | Gomes et al. | |
| 2023/0315334 A1 | 10/2023 | Sharma et al. | |

FOREIGN PATENT DOCUMENTS

KR    20050025255 A  *  3/2005  .......... G11C 7/1042

OTHER PUBLICATIONS

U.S. Appl. No. 17/708,398, filed Mar. 30, 2022, entitled "Providing Fine Grain Access to Package Memory," by Abhishek Anil Sharma, et al., 22 pgs.
U.S. Appl. No. 17/708,417, filed Mar. 30, 2022, entitled "Scalable Architecture for Multi-Die Semiconductor Packages," by Abhishek Anil Sharma, et al., 24 pgs.
U.S. Appl. No. 17/850,044, filed Jun. 27, 2022, entitled "Reconfigurable Vector Processing in a Memory," by Abhishek Anil Sharma, et al., 31 pgs.

* cited by examiner

*Primary Examiner* — Brian R Peugh
(74) *Attorney, Agent, or Firm* — Nicholson De Vos Webster & Elliott LLP

(57) ABSTRACT

In one embodiment, an apparatus comprises: a plurality of banks to store data; and a plurality of interconnects, each of the plurality of interconnects to couple a pair of the plurality of banks. In response to a data movement command, a first bank of the plurality of banks is to send data directly to a second bank of the plurality of banks via a first interconnect of the plurality of interconnects. Other embodiments are described and claimed.

20 Claims, 11 Drawing Sheets

PERFORMING DISTRIBUTED PROCESSING USING DISTRIBUTED MEMORY

BACKGROUND

Many processors perform operations on matrix data, vector data, and other large data blocks. Oftentimes, the processor will write the data to a memory using a scatter operation, and after it processes the data, it performs a gather operation to collect the data from the memory. Especially for large data blocks, such operations can have high latency.

DETAILED DESCRIPTION

In various embodiments, distributing processing may be realized in a system having memory closely coupled with processing circuitry. More specifically, with embodiments different portions of the memory may be locally coupled with different portions of the processing circuitry to provide distributed processing and ready access to data. Still further, the memory may be configured with distributed banks or other arrays that are closely coupled with local processing circuitry.

At least some of these banks may be interconnected by way of physical interconnects, such that the banks may perform distributed message exchanges with neighboring banks so that data (e.g., input or output data) can be locally shared, reducing latency and power consumption.

In various embodiments, an integrated circuit (IC) package may include multiple dies in stacked relation. More particularly in embodiments, at least one compute die may be adapted on a memory die in a manner to provide fine-grained memory access by way of localized dense connectivity between compute elements of the compute die and localized banks (or other local portions) of the memory die. This close physical coupling of compute elements to corresponding local portions of the memory die enables the compute elements to locally access local memory portions, in contrast to a centralized memory access system that is conventionally implemented via a centralized memory controller.

Figure 1:
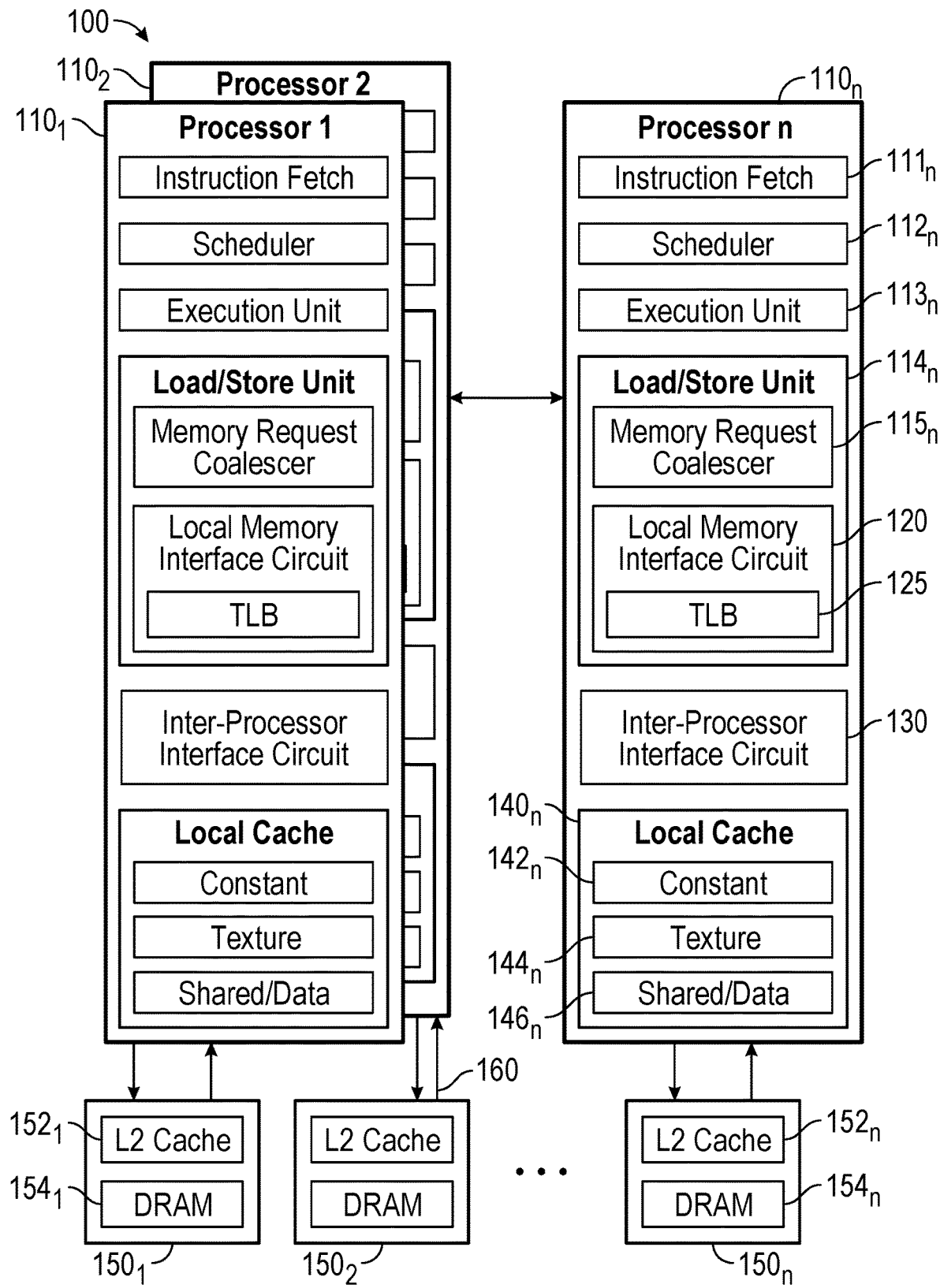
FIG. 1 is a block diagram of a package having memory tightly coupled with processing circuitry in accordance with an embodiment.

Referring now to FIG. 1, shown is a block diagram of a package having memory tightly coupled with processing circuitry in accordance with an embodiment. As shown in FIG. 1, package 100 includes a plurality of processors $110_1$-$110_n$. In the embodiment shown, processors 110 are implemented as streaming processors. However embodiments are not limited in this regard, and in other cases the processors may be implemented as general-purpose processing cores, accelerators such as specialized or fixed function units or so forth. As used herein, the term "core" refers generally to any type of processing circuitry that is configured to execute instructions, tasks and/or workloads, namely to process data.

In the embodiment of FIG. 1, processors 110 each individually couple directly to corresponding portions of a memory 150, namely memory portions $150_1$-$150_n$. As such, each processor 110 directly couples to a corresponding local portion of memory 150 without a centralized interconnection network therebetween. In one or more embodiments described herein, this direct coupling may be implemented by stacking multiple die within package 100. For example, processors 110 may be implemented on a first die and memory 150 may be implemented on at least one other die, where these dies may be stacked on top of each other, as will be described more fully below. By "direct coupling" it is meant that a processor (core) is physically in close relation to a local portion of memory in a non-centralized arrangement so that the processor (core) has access only to a given local memory portion and without communicating through a memory controller or other centralized controller.

As seen, each instantiation of processor 110 may directly couple to a corresponding portion of memory 150 via interconnects 160. Although different physical interconnect structures are possible, in many cases, interconnects 160 may be implemented by one or more of conductive pads, bumps or so forth. Each processor 110 may include through silicon vias (TSVs) that directly couple to TSVs of a corresponding local portion of memory 150. In such arrangements, interconnects 160 may be implemented as bumps or hybrid bonding or other bumpless technique.

Memory 150 may, in one or more embodiments, include a level 2 (L2) cache 152 and a dynamic random access memory (DRAM) 154. As illustrated, each portion of memory 150 may include one or more banks or other portions of DRAM 154 associated with a corresponding processor 110. In one embodiment, each DRAM portion 154 may have a width of at least 1024 words. Of course other widths are possible. Also while a memory hierarchy including both an L2 cache and DRAM is shown in FIG. 1, it is possible for an implementation to provide only DRAM 154 without presence of an L2 cache (at least within memory 150). This is so, as DRAM 154 may be configured to operate as a cache, as it may provide both spatial and temporal locality for data to be used by its corresponding processor 110. This is particularly so when package 100 is included in a system having a system memory (e.g., implemented as dual-inline memory modules (DIMMs) or other volatile or non-volatile memory). Note that to enable ready access to data of different memory portions, e.g., implemented as separate banks, local interconnects may couple adjacent memory portions 150 (e.g., in multiple dimensions; not shown in FIG. 1 for ease of illustration).

With embodiments, package 100 may be implemented within a given system implementation, which may be any type of computing device that is a shared DRAM-less system, by using memory 150 as a flat memory hierarchy. Such implementations may be possible, given the localized dense connectivity between corresponding processors 110 and memory portions 150 that may provide for dense local access on a fine-grained basis. In this way, such implementations may rely on physically close connections to localized memories 150, rather than a centralized access mechanism, such as a centralized memory controller of a processor. Further, direct connection occurs via interconnects 160 without a centralized interconnection network.

Still with reference to FIG. 1, each processor 110 may include an instruction fetch circuit 111 that is configured to fetch instructions and provide them to a scheduler 112. Scheduler 112 may be configured to schedule instructions for execution on one or more execution circuits 113, which may include arithmetic logic units (ALUs) and so forth to perform operations on data in response to decoded instructions, which may be decoded in an instruction decoder, either included within processor 110 or elsewhere within an SoC or another processor.

As further shown in FIG. 1, processor 110 also may include a load/store unit 114 that includes a memory request coalescer 115. Load/store unit 114 may handle interaction with corresponding local memory 150. To this end, each processor 110 further may include a local memory interface circuit 120 that includes a translation lookaside buffer (TLB) 125. In other implementations local memory interface circuit 120 may be separate from load/store unit 114.

In embodiments herein, TLB 125 may be configured to operate on only a portion of an address space, namely that portion associated with its corresponding local memory 150. To this end, TLB 125 may include data structures that are configured for only such portion of an entire address space. For example, assume an entire address space is $2^{64}$ bytes corresponding to a 64-bit addressing scheme. Depending upon a particular implementation and sizing of an overall memory and individual memory portions, TLB 125 may operate on somewhere between approximately 10 and 50 bits.

Still with reference to FIG. 1, each processor 110 further includes a local cache 140 which may be implemented as a level 1 (L1) cache. Various data that may be frequently and/or recently used within processor 110 may be stored within local cache 140. In the illustration of FIG. 1, exemplary specific data types that may be stored within local cache 140 include constant data 142, texture data 144, and shared/data 146. Note that such data types may be especially appropriate when processor 110 is implemented as a graphics processing unit (GPU). Of course other data types may be more appropriate for other processing circuits, such as general-purpose processing cores or other specialized processing units.

Still referring to FIG. 1, each processor 110 may further include an inter-processor interface circuit 130. Inter-processor interface circuit 130 may be configured to provide communication between a given processor 110 and its neighboring processors, e.g., a nearest neighbor on either side of processor 130. Although embodiments are not limited in this regard, in one or more embodiments inter-processor interface circuit 130 may implement a message passing interface (MPI) to provide communication between neighboring processors. While shown at this high level in the embodiment of FIG. 1, many variations and alternatives are possible. For example, more dies may be present in a given package, including multiple memory dies that form one or more levels of a memory hierarchy and additional compute, interface, and/or controller dies.

Figure 2:
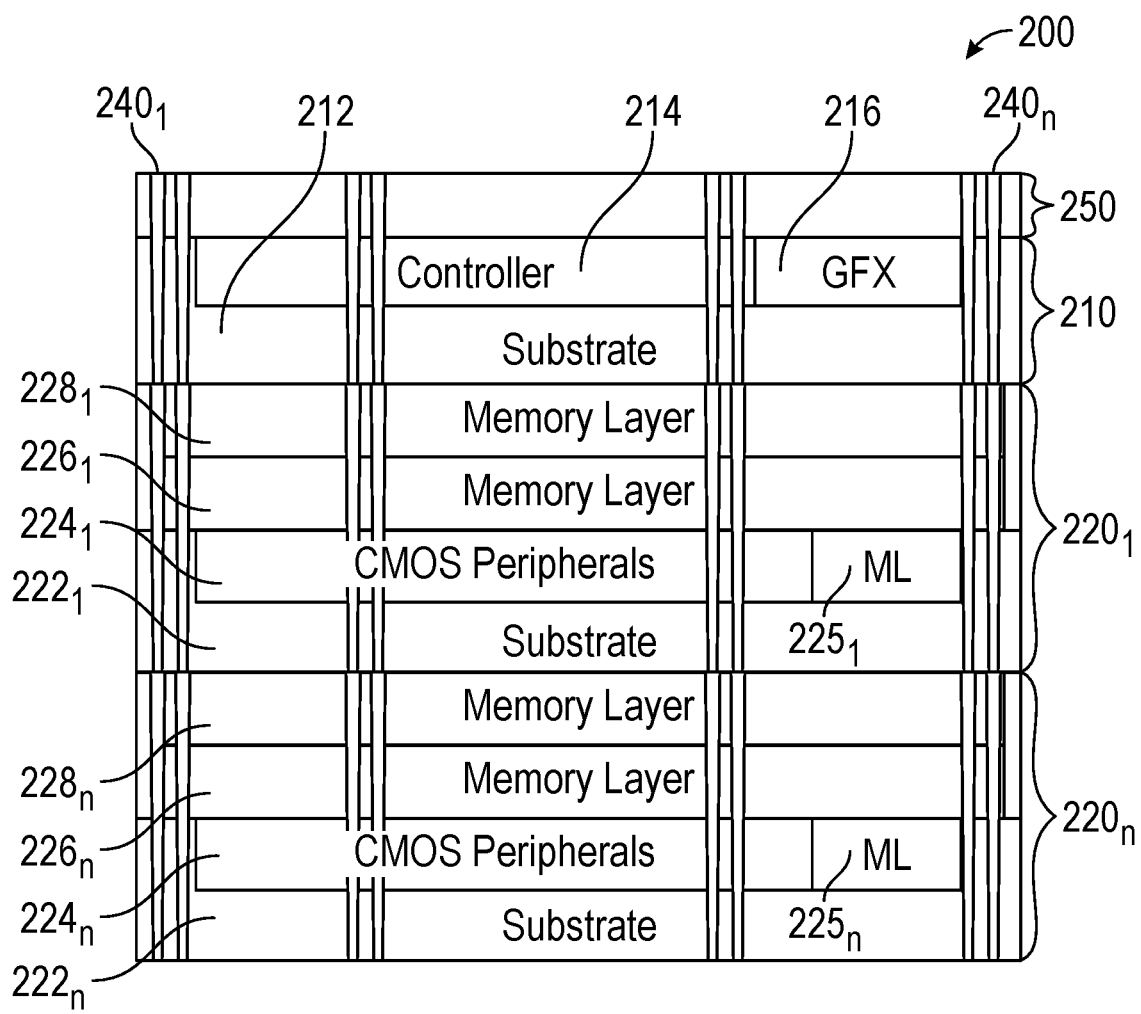
FIG. 2 is a cross sectional view of a package in accordance with an embodiment.

Referring now to FIG. 2, shown is a cross sectional view of a package in accordance with an embodiment. As shown in FIG. 2, package 200 is a multi-die package including a set of stacked die, namely a first die 210, which may be a compute die and multiple memory die $220_1$ and $220_2$. With this stacked arrangement, compute die 210 may be stacked above memory die 220 such that localized dense connectivity is realized between corresponding portions of memory die 220 and compute die 210. As further illustrated, a package substrate 250 may be present onto which the stacked dies may be adapted. In an embodiment, compute die 210 may be adapted at the top of the stack to improve cooling.

As further illustrated in FIG. 2, physical interconnection between circuitry present on the different die may be realized by TSVs $240_1$-$240_n$ (each of which may be formed of independent TSVs of each die). In this way, individual memory cells of a given portion may be directly coupled to circuitry present within compute die 210. Note further that in FIG. 2, in the cross-sectional view, only circuitry of a single processing circuit and a single memory portion is illustrated. As shown, with respect to compute die 210, a substrate 212 is provided in which controller circuitry 214 and graphics circuitry 216 is present.

With reference to memory die 220, a substrate 222 is present in which complementary metal oxide semiconductor (CMOS) peripheral circuitry 224 may be implemented, along with memory logic (ML) 225, which may include localized memory controller circuitry and/or cache controller circuitry. In certain implementations, CMOS peripheral circuitry 224 may include encryption/decryption circuitry, in-memory processing circuitry or so forth. As further illustrated, each memory die 220 may include multiple layers of memory circuitry. In one or more embodiments, there may be a minimal distance between CMOS peripheral circuitry 224 and logic circuitry (e.g., controller circuitry 214 and graphics circuitry 216) of compute die 210, such as less than one micron.

As shown, memory die 220 may include memory layers 226, 228. While shown with two layers in this example, understand that more layers may be present in other implementations. In each layer, a plurality of bit cells may be provided, such that each portion of memory die 220 provides a locally dense full width storage capacity for a corresponding locally coupled processor. Note that memory die 220 may be implemented in a manner in which the memory circuitry of layers 226, 228 may be implemented with backend of line (BEOL) techniques. While shown at this high level in FIG. 2, many variations and alternatives are possible.

Figure 3:
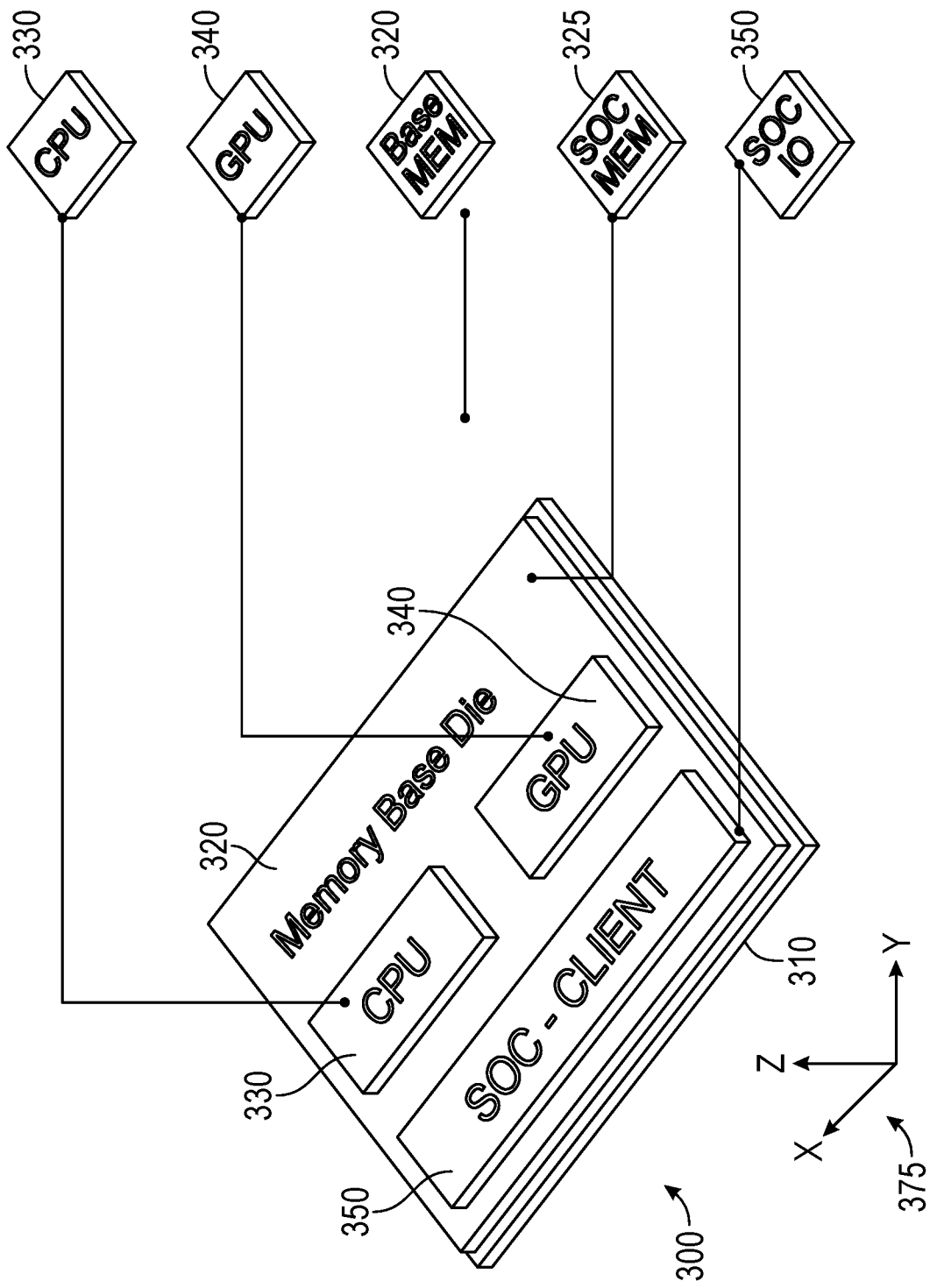
FIG. 3 is a block diagram of a scalable integrated circuit package in accordance with an embodiment.

Referring now to FIG. 3, shown is a block diagram of a scalable integrated circuit (IC) package in accordance with an embodiment. As shown in FIG. 3, package 300 is shown in an opened state; that is, without an actual package adapted about the various circuitry present. In the high level shown in FIG. 3, package 300 is implemented as a multi-die package having a plurality of dies adapted on a substrate 310. Substrate 310 may be a glass or sapphire substrate (to support wide bandwidth with low parasitics) and may, in some cases, include interconnect circuitry to couple various dies within package 300 and to further couple to components external to package 300.

In the illustration of FIG. 3, a memory die 320 is adapted on substrate 310. In embodiments herein, memory die 320 may be a DRAM that is arranged according to an embodiment herein, namely with local interconnect circuitry to couple neighboring banks to enable data to be communicated directly between banks as described herein. In addition, each of the local portions may directly and locally couple with a corresponding local processor such as a general-purpose or specialized processing core with which it is associated (such as described above with regard to FIGS. 1 and 2).

In one or more embodiments, each local portion or bank may be configured as an independent memory channel, e.g., as a double data rate (DDR) memory channel. In some embodiments, these DDR channels of memory die 320 may be an embedded DRAM (eDRAM) that replaces a conventional package-external DRAM, e.g., formed of conventional dual inline memory modules (DIMMs). While not shown in the high level view of FIG. 3, memory die 320 may further include an interconnection network, such as at least a portion of a global interconnect network that can be used to couple together different dies that may be adapted above memory die 320.

As further shown in FIG. 3, multiple dies may be adapted above memory die 320. As shown, a central processing unit (CPU) die 330, a graphics (graphics processing unit (GPU)) die 340, and a SoC die 350 all may be adapted on memory die 320. FIG. 3 further shows in inset these disaggregated dies, prior to adaptation in package 300. CPU die 330 and GPU die 340 may include a plurality of general-purpose processing cores and graphics processing cores, respectively. In some use cases, instead of a graphics die, another type of specialized processing unit (generically referred to as an "XPU") may be present. Regardless of the specific compute dies present, each of these cores may locally and directly couple to a corresponding portion of the DRAM of memory die 320, e.g., by way of TSVs, as discussed above. In addition, CPU die 330 and GPU die 340 may communicate via interconnect circuitry (e.g., a stitching fabric or other interconnection network) present on or within memory die 320. Similarly, additional circuitry of an SoC, including interface circuitry to interface with other ICs or other components of a system may occur via circuitry of SoC die 350.

While shown with a single CPU die and single GPU die, in other implementations multiple ones of one or both of CPU and GPU dies may be present. More generally, different numbers of CPU and XPU dies (or other heterogenous dies) may be present in a given implementation.

Package 300 may be appropriate for use in relatively small computing devices such as smartphones, tablets, embedded systems and so forth. As discussed, with the ability to provide scalability by adding multiple additional processing dies, packages in accordance with embodiments can be used in these and larger more complex systems.

Further while shown with this particular implementation in FIG. 3, in some cases one or more additional memory dies configured with local DRAM portions similar to memory die 320 may be present. It is also possible for one or more of these additional memory dies to be implemented as conventional DRAM, to avoid the need for package-external DRAM.

Thus as shown in the inset of FIG. 3, an additional memory die 325 may take the form of a conventional DRAM. In such an implementation, memory die 320 may be managed to operate as at least one level of a cache memory hierarchy, while memory die 325 acts as a system memory, providing higher storage capacity. Depending on implementation, memory die 320 may be adapted on memory die 325, which is thus sandwiched between memory die 320 and substrate 310. While shown at this high level in the embodiment of FIG. 3, many variations and alternatives are possible. For example, as shown with reference to X-Y-Z coordinate system 375, package 300 can be extended in each of 3 dimensions to accommodate larger die footprints, as well as to provide additional dies in a stacked arrangement.

Figure 4:
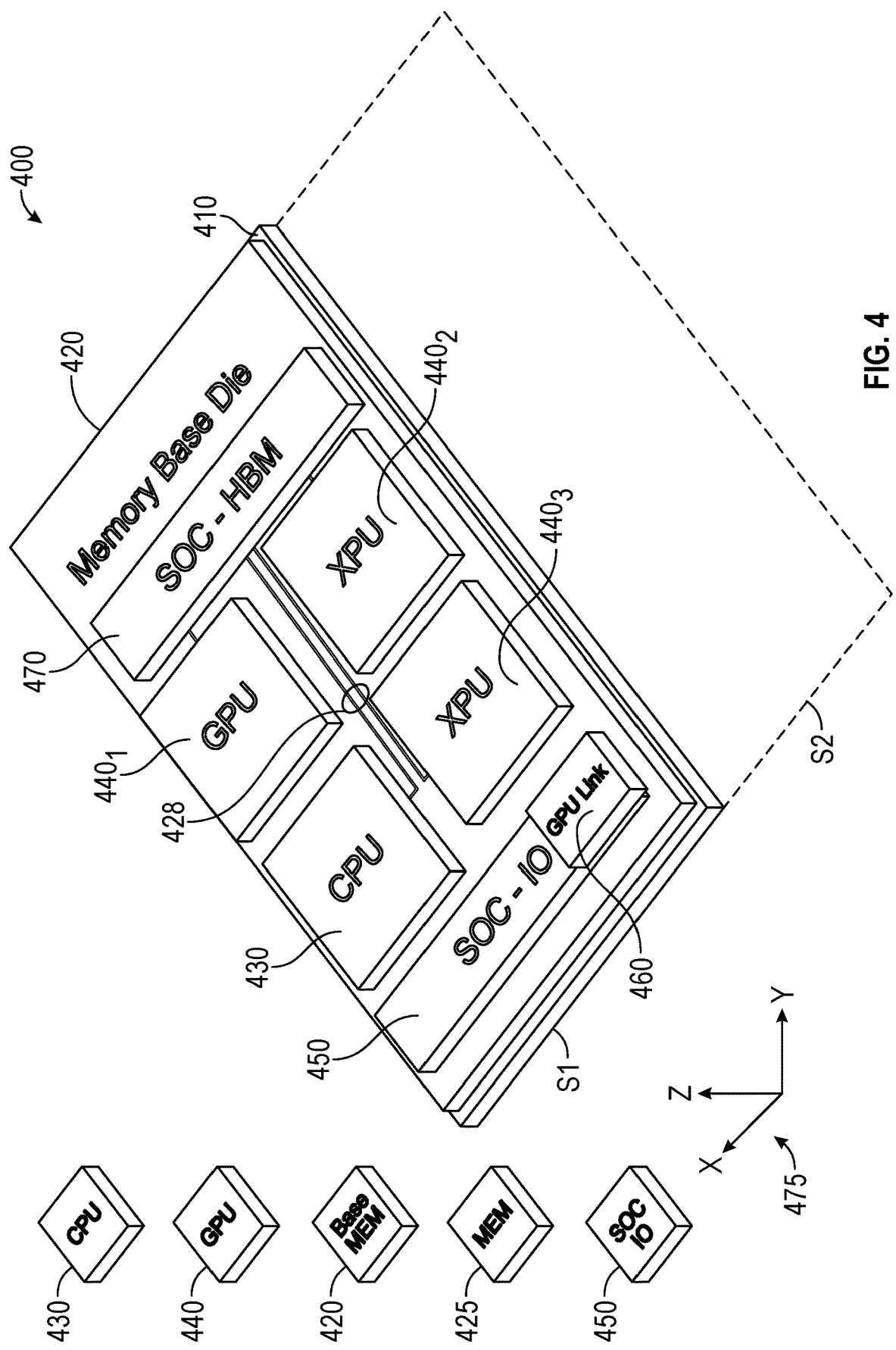
FIG. 4 is a block diagram of a scalable package in accordance with another embodiment.

Additional dies may be adapted within a package in accordance with other embodiments. Referring now to FIG. 4, shown is a block diagram of a package in accordance with another embodiment. In FIG. 4, multi-die package 400 includes a similar stacked arrangement of dies, including substrate 410, memory die 420 and additional die adapted on memory die 420. Since similar dies may be present in the embodiment of FIG. 4 as in the FIG. 3 embodiment, the same numbering scheme is used (of the "400" series, instead of the "300" series of FIG. 3).

However in the embodiment of FIG. 4, package 400 includes additional dies adapted on memory die 420. As shown, in addition to CPU die 430, three additional dies $440_{1-3}$ are present. More specifically, die $440_1$ is a GPU die and dies $440_{2-3}$ are XPU dies. As with the above discussion, each die 440 may locally couple to corresponding local portions of DRAM of a memory die 420 by way of TSVs. In this way, individual processing cores within each of dies 440 may be locally coupled with corresponding local memory. And, as shown in FIG. 4, memory die 420 may include an interconnection network 428 (or other switching or stitching fabric) that may be used to couple together two or more of the dies adapted on memory die 420. Note that interconnect network 428 may be included on and/or within memory die 420.

Still with reference to FIG. 4, additional SoC dies may be present, including an SoC die 470 which may include memory controller circuitry that can interface with a high bandwidth memory (HBM) that is external to package 400. In addition, multiple interface die, including an SoC interface die 450 and a graphics interface die 460, may be present, which may provide interconnection between various dies within package 400 and external components.

As with the above discussion of FIG. 3, one or more additional memory die (e.g., memory die 425 shown in the inset) may be stacked within the package arrangement. Such additional memory die may include one or more dies including DRAM configured with local portions and interconnection circuitry as with memory die 420, and/or conventional DRAM. In this way, package 400 may be used in larger, more complex systems, including high end client computing devices, server computers, or other data center equipment.

Still further, understand that package 400 may represent, with respect to memory die 420, a single stamping (S1) or base die arrangement of memory circuitry including multiple local memory portions and corresponding interconnect circuitry. This single stamping may be one of multiple such stampings (representative additional stamping S2 is shown in dashed form in FIG. 4) that can be fabricated on a semiconductor wafer, which is then diced into multiple iterations of this base memory die, where each die has the same stamping, namely, the same circuitry.

It is also possible to provide a multi-die package that is the size of an entire semiconductor wafer (or at least substantially wafer-sized) (e.g., a typical 300 millimeter (mm) semiconductor wafer). With such arrangement, a single package may include multiple stampings of a base memory die (or multiple such dies). In turn, each of the stampings may have adapted thereon multiple processing dies and associated circuitry. As an example, assume that base memory die 420 of FIG. 4 has first dimensions to represent a single stamping. Extending this stamping in the x and y directions for an entire wafer size may enable a given plurality of stampings to be present. In this way, a package having a substantially wafer-sized memory base layer may include a given number of iterations of the die configuration shown in FIG. 4. Thus with embodiments, scalability may be realized in all of x, y, and z dimensions of X-Y-Z coordinate system 475.

Figure 5:
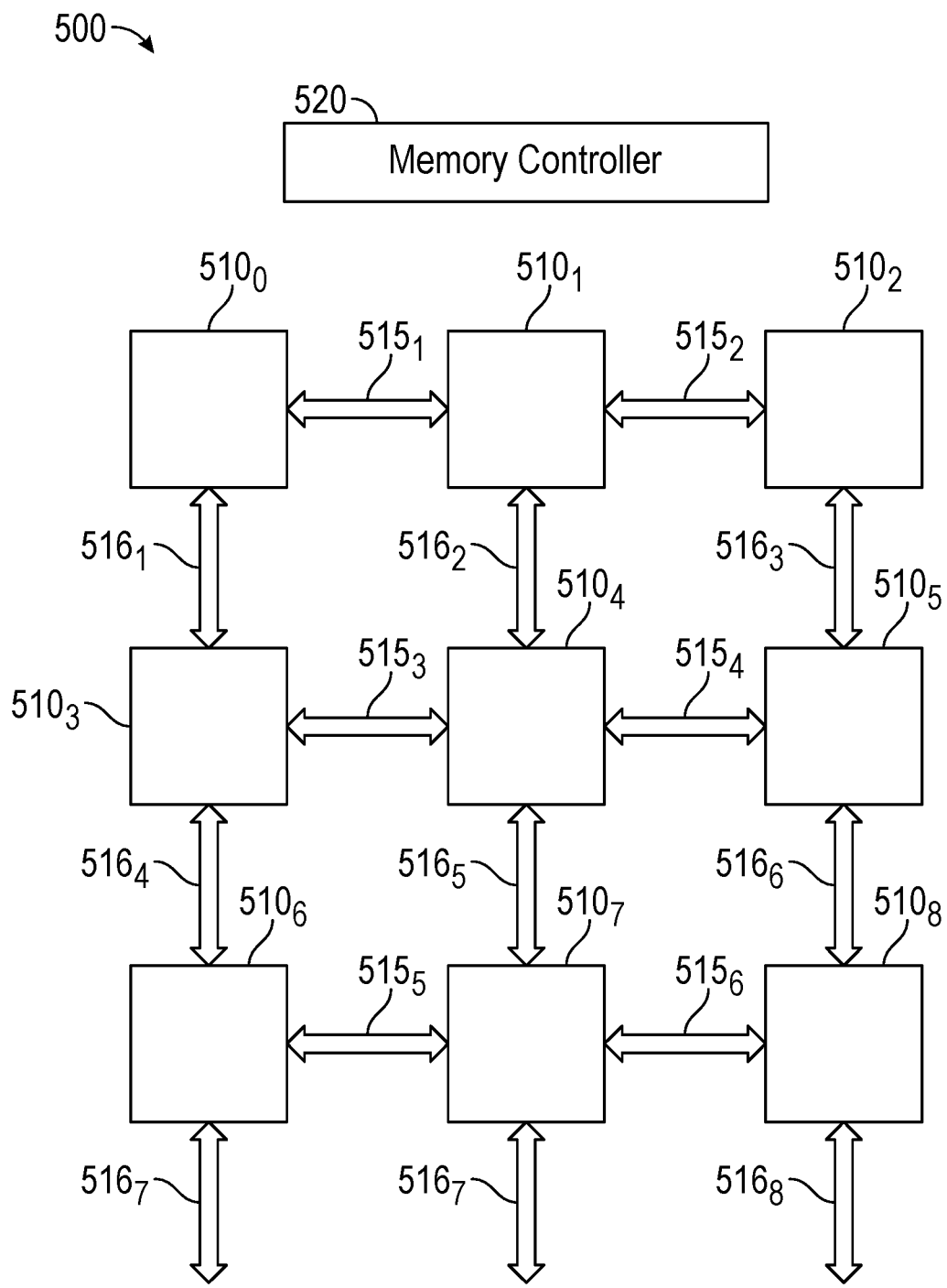
FIG. 5 is a block diagram of a memory in accordance with an embodiment.

Referring now to FIG. 5, shown is a block diagram of a memory in accordance with an embodiment. As shown in FIG. 5, memory 500 may be implemented as a DRAM having a plurality of banks $510_{0-8}$. Understand while shown with nine such banks for discussion purposes, a given memory may include many more such banks. Although embodiments are not limited in this regard, each bank 510 may be configured to store approximately 1 megabyte (MB) of data. To enable efficient local communication between neighboring banks 510, a first set of interconnects $515_{1-6}$ are provided to couple neighboring banks in a first orientation (horizontally per the reference view of FIG. 5). In turn, a second set of interconnects $516_{1-8}$ are provided to couple neighboring banks in a second orientation (vertically per the reference view).

Thus with an embodiment as in FIG. 5, neighboring memory banks can exchange messages to perform data transfers locally. Although use cases may vary, in some vases memory 500 may enable data transfer for use cases including scatter-gather operations, convolutions and other data processing such as may be performed in a given machine learning or other artificial intelligence application.

Furthermore, embodiments may leverage a close relation between the memory and processing circuitry, which may be located on one or more other layers of a memory die or such processing circuitry may be present on another die that is stacked with the memory die, e.g., via bump connections or hybrid bonding.

While FIG. 5 shows memory banks 510 being generic and uniform, understand that in some implementations, memory 500 may be a custom-designed memory in which each memory bank may have a different physical structure, e.g., with certain arrays or banks arranged with bitlines in a horizontal direction and wordlines in a vertical direction and other banks arranged vice versa. In this way embodiments may leverage this structure to advantageously perform certain vector operations on row and column data in a more effective manner, as column data may be read as efficiently as row data.

In some embodiments, a memory may include a distributed memory controller to perform scatter-gather operations. As an example, memory 500 may include a controller 520 that while shown as a single logical block, may be implemented in a distributed manner. Memory controller 520 may be in communication with a processor and further with higher hierarchy memory such that large amounts of data (e.g., 1 gigabyte (GB)) may be provided to memory 500 and by way of a distributed operation, e.g., a scatter operation, memory controller 520 may cause a bank's size of data of this larger amount of data to be provided to each bank 510. In some embodiments, data may be provided vertically into memory 500 (e.g., directly to memory controller 520 from processing circuitry or another source), and then can move across memory 500 via inter-bank communications between neighboring banks using one or more of interconnects 515, 516.

At this point with available input data, processing circuitry (which as discussed above, may be local to particular banks 510) may perform a variety of processing operations on the data. After potentially multiple operations, where result information may pass from one bank 510 to a neighbor bank 510 via a given one of interconnects 515 or 516, processing may be completed. In turn memory controller 520 may perform a gather operation to obtain result data from at least a subset of banks 510 and provide it to a destination.

Figure 6:
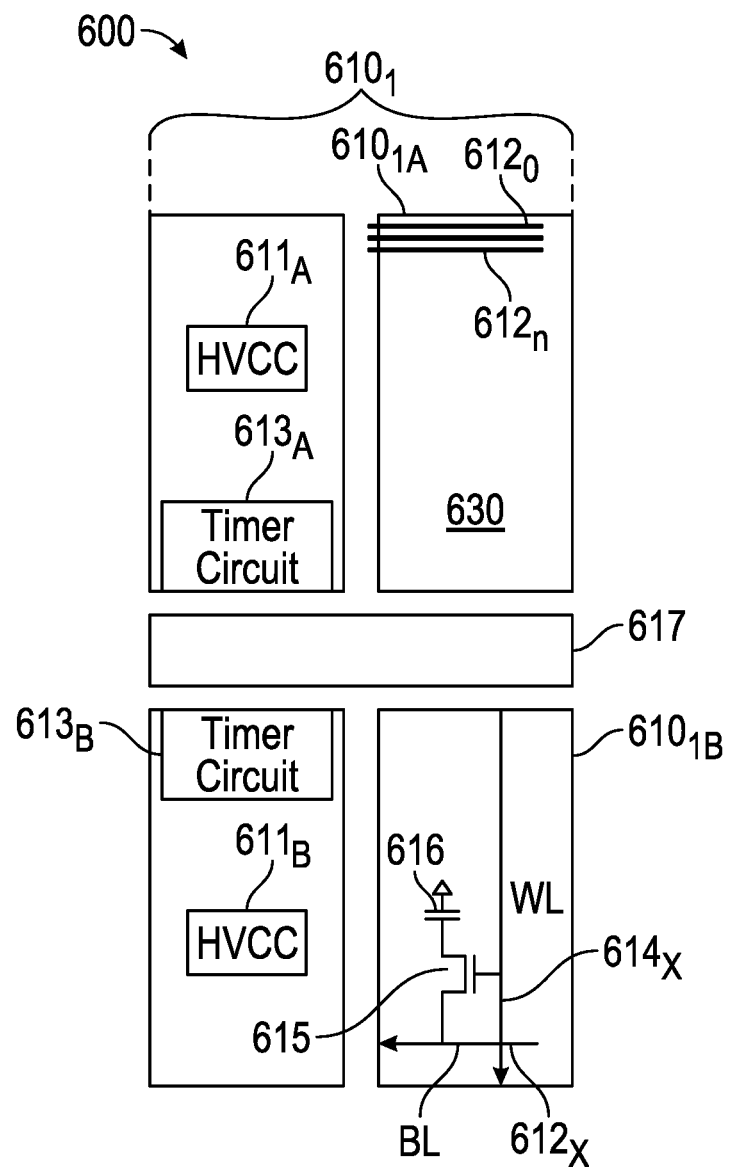
FIG. 6 is a schematic diagram illustrating an arrangement of A memory bank in accordance with an embodiment.

Referring now to FIG. 6, shown is a schematic diagram illustrating an arrangement of a bank in accordance with an embodiment. As shown in FIG. 6, memory 600 includes a first bank $610_1$ having a first orientation and multiple sections $610_{1A,1B}$. Although only two sections are shown, many more sections may be present in a given bank. As seen, first bank $610_1$ has horizontally arranged bitlines $612_{0-N}$ and vertically arranged wordlines (e.g., wordline $612_x$). This bank may be configured to store row information of a matrix. Section $610_{1B}$ shows a particular implementation of a bitcell to store a single bit of data. As shown the bitcell is formed of an intersection of a bitline $612_x$ and a wordline $616_x$. As shown, wordline $616_x$ couples to a gate terminal of a transistor 615 (e.g., a p-type metal oxide semiconductor (PMOS) transistor) having one of a source or drain terminal coupled to bitline $612_x$ and the other terminal of which is coupled to a capacitor 616 (having another plate coupled to a ground reference). As further shown, a wordline (WL) driver circuit 617 is horizontally adapted and may couple to corresponding wordlines of the different portions.

Still referring to bank $610_1$, additional circuitry may be present, including high voltage control circuitry (HVCC) ($611_{A,B}$) and timer circuits $613_{A, B}$. In addition, FIG. 6 is arranged as a top view where all the above-described circuitry is adapted above a CMOS layer 630, which may underly some or all of bank sections $610_{1A, 1B}$.

In some embodiments, CMOS layer 630 may be adapted on one or more layers of the same die as first bank $610_1$. In other cases, CMOS layer 630 may be part of a different die in a stacked relation with the memory die. In any case, CMOS layer 630 may include various logic circuitry for controlling the memory and further may include computation circuitry for performing computations as described herein, such as machine learning applications or other workloads.

In a given memory configuration, first bank $610_1$ may couple to each of multiple neighboring banks (not shown for ease of illustration in FIG. 6) by individual interconnects, such as the interconnects shown in FIG. 5. In one or more implementations, at least one neighboring bank may have an orthogonal orientation such that its wordlines may be horizontally aligned and bitlines vertically aligned. Continuing with the above example, this neighboring bank may be configured to store column data of a matrix in a manner that this data is as easily accessible as row dat. Although shown at this high level in the embodiment of FIG. 6, many variations and alternatives are possible.

Figure 7:
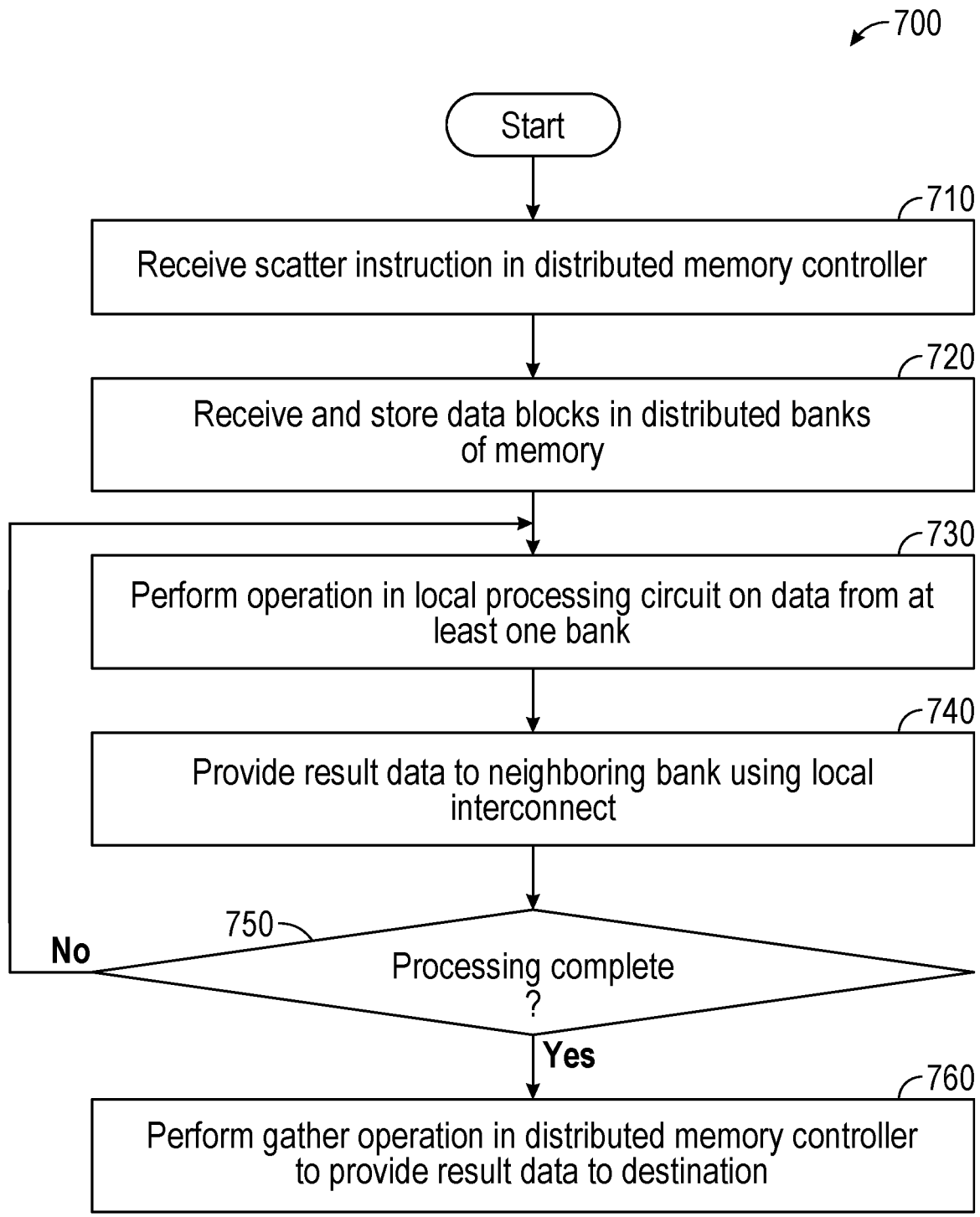
FIG. 7 is a flow diagram of a method in accordance with an embodiment.

Referring now to FIG. 7, shown is a flow diagram of a method in accordance with an embodiment. As shown in FIG. 7, method 700 is a method for performing distributed processing using computation circuitry in close relation with memory circuitry as described herein. As such, method 700 may be performed by hardware circuitry, including a memory controller along with the computation circuitry, leveraging a distributed memory in accordance with an embodiment.

As illustrated, method 700 begins by receiving a scatter instruction in the distributed memory controller (block 710). Understand that this scatter instruction may be received from a processor core. In response to this scatter instruction, the distributed memory controller may initiate a scatter operation. More specifically at block 720, data blocks may be received and stored in distributed banks of the memory. These data blocks may form a large chunk of data, e.g., 1 MB of data, which may be obtained from another portion of a memory hierarchy.

Still referring to FIG. 7, next at block 730 an operation may be performed in a local processing circuit on data from at least one bank. That is as described herein, there may be multiple local processing circuits that are located closely to particular memory banks. In different cases, all the data for a given operation may be obtained from one memory bank, or different source operands for the operation can be obtained from neighboring banks.

A variety of different operations may be performed using a memory in accordance with an embodiment, such as a range of machine learning-based processing on input data. In some cases, the memory may be a custom-designed memory (with different banks oriented differently to enable efficient access to row and column data of matrices).

As one example, source data received via the scatter operation may be of an image. A first operation may be to identify edges, such that this operation may be an edge determination process. Next at block 740, result data may be provided to a neighboring bank using a local interconnect. Thereafter it may be determined whether processing is complete (diamond 750). This determination may be based on whether complete operations for a particular process has been completed.

If not, control passes to block 730 where another operation may be performed. For example, for a next step of an overall process, additional processing such as a convolution may be performed, which may include addition and/or subtraction operations. Thereafter, another memory update may occur for a result of this additional processing. The result may be provided to a neighboring bank, using a local interconnect.

When complete processing is performed, control passes from diamond 750 to block 760 where a gather operation may be performed. More specifically, via the gather operation, the distributed memory controller may cause result data that is present in various banks to be obtained and provided to a requester, e.g., a core or other processor, or other destination. Understand while shown at this high level in the embodiment of FIG. 7, many variations and alternatives are possible.

Accordingly, using method 700, sequential processing may be performed in individual computation circuits that are closely associated with one or more memory banks. In addition, with a memory architecture such as shown above in FIG. 5, sequential message passing may occur between neighboring banks.

As one particular example, a matrix, such as representing an incoming image, may be split into two portions and provided to two different banks for processing. After initial processing, comparisons may be performed between the image data of this sample and a training set, using distributed processing as described herein. In this way, latency of such operation may be reduced, as bandwidth may increase. That is, rather than incurring bandwidth latencies for an N×N logic and N×N memory, data may be routed via a memory itself using the nearest neighbor message passing as described herein, reducing latency by a factor of ×N.

Packages in accordance with embodiments can be incorporated in many different system types, ranging from small portable devices such as a smartphone, laptop, tablet or so forth, to larger systems including client computers, server computers and datacenter systems.

Figure 8:
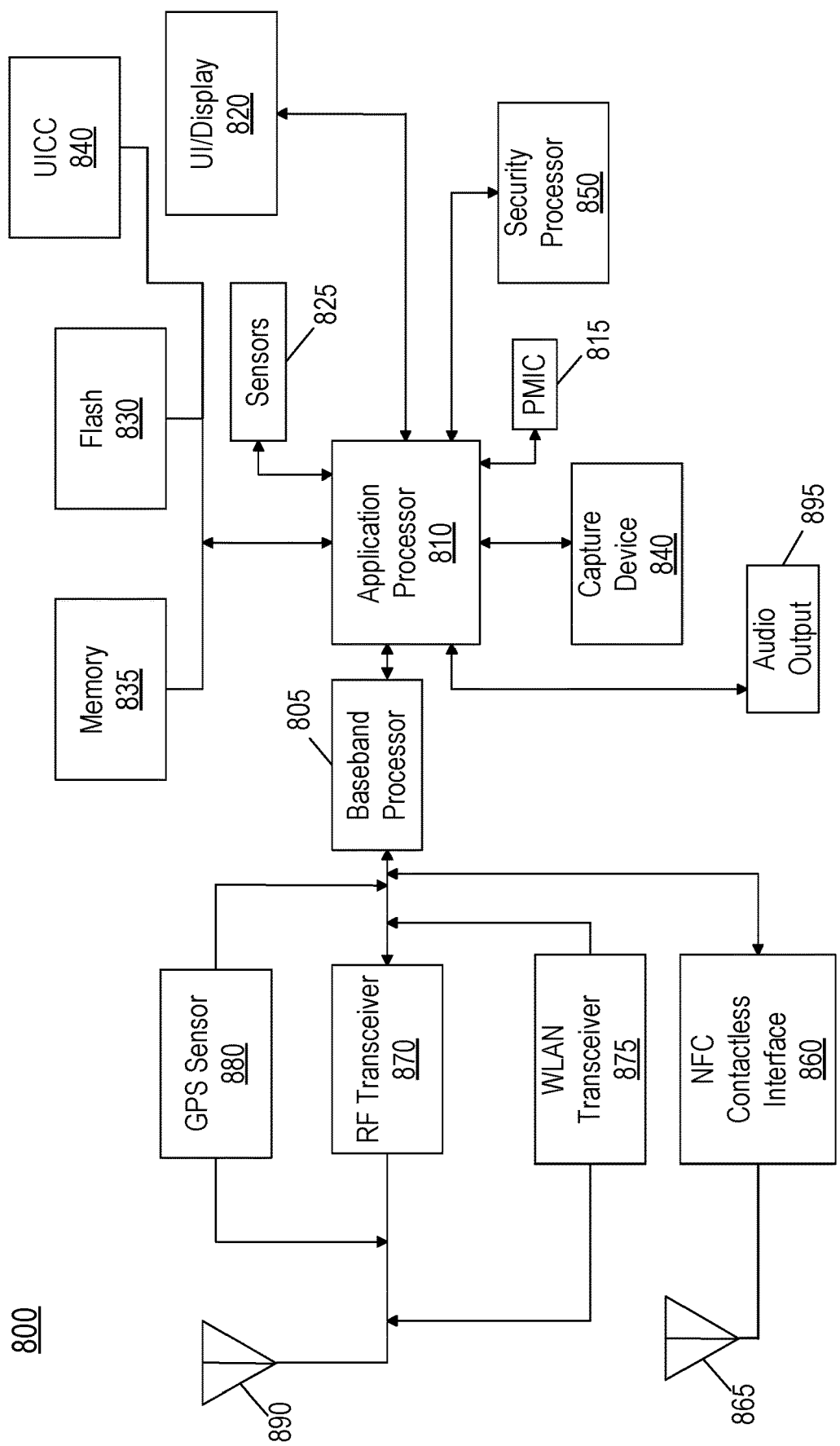
FIG. 8 is a block diagram of an example system with which embodiments can be used.

Referring now to FIG. 8, shown is a block diagram of an example system with which embodiments can be used. As seen, system 800 may be a smartphone or other wireless communicator. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia apps. Application processor 810 may further be configured to perform a variety of other computing operations for the device.

In turn, application processor 810 can couple to a user interface/display 820, e.g., a touch screen display. In addition, application processor 810 may couple to a memory system including a non-volatile memory, namely a flash memory 830 and a system memory, namely a dynamic random access memory (DRAM) 835. In embodiments herein, a package may include multiple dies including at least processor 810 and DRAM 835, which may be stacked and configured as described herein. As further seen, application processor 810 further couples to a capture device 840 such as one or more image capture devices that can record video and/or still images.

Still referring to FIG. 8, a universal integrated circuit card (U ICC) 840 comprising a subscriber identity module and possibly a secure storage and cryptoprocessor is also coupled to application processor 810. System 800 may further include a security processor 850 that may couple to application processor 810. A plurality of sensors 825 may couple to application processor 810 to enable input of a variety of sensed information such as accelerometer and other environmental information. An audio output device 895 may provide an interface to output sound, e.g., in the form of voice communications, played or streaming audio data and so forth.

As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

Figure 9:
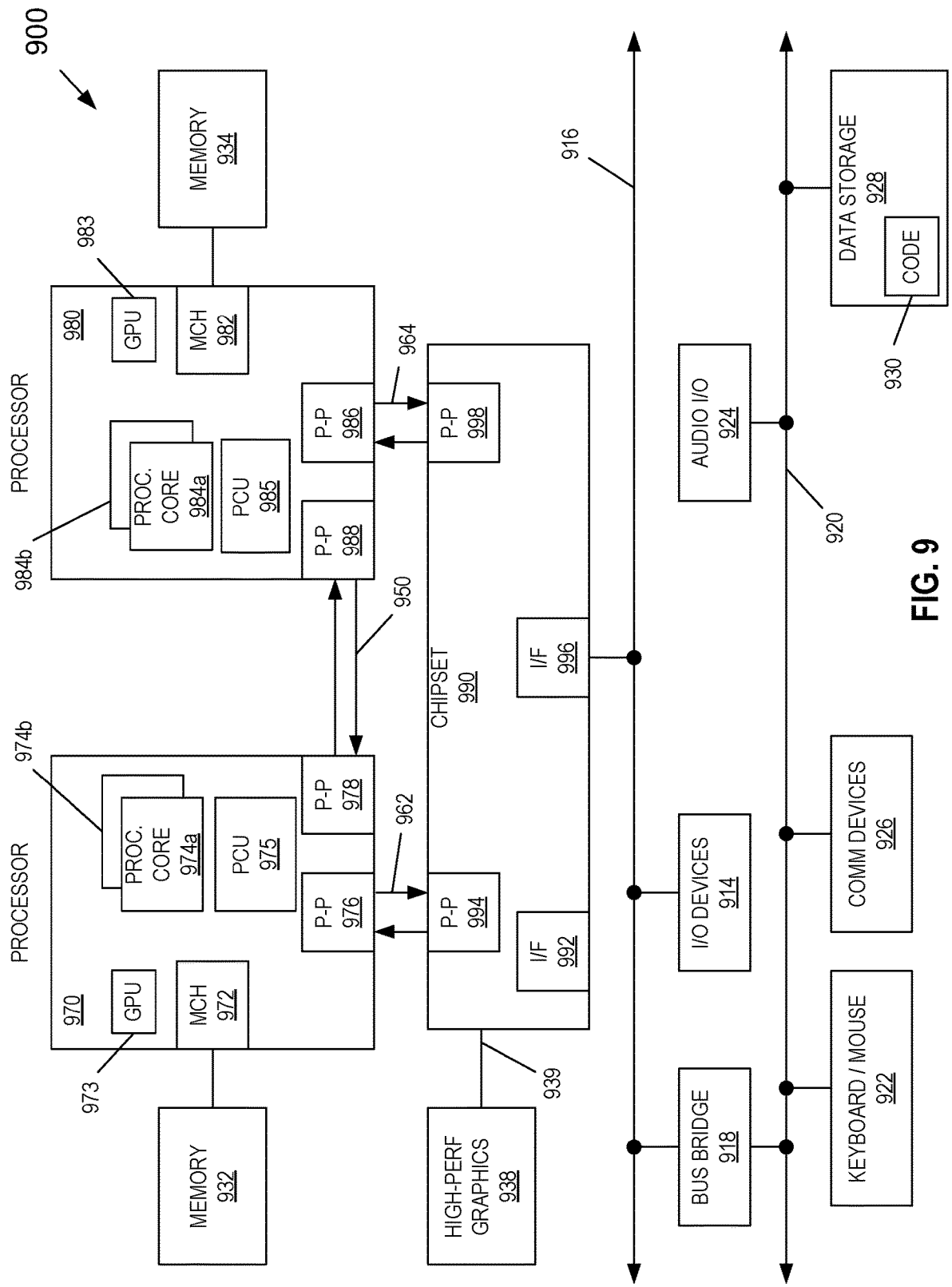
FIG. 9 is a block diagram of a system in accordance with another embodiment.

Embodiments may be implemented in other system types such as client or server systems. Referring now to FIG. 9, shown is a block diagram of a system in accordance with another embodiment. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processors 974*a* and 974*b* and processor cores 984*a* and 984*b*), although potentially many more cores may be present in the processors. In addition, each of processors 970 and 980 also may include a graphics processor unit (GPU) 973, 983 to perform graphics operations. Each of the processors can include a power control unit (PCU) 975, 985 to perform processor-based power management.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. In embodiments herein, one or more packages may include multiple dies including at least processor 970 and memory 932 (e.g.), which may be stacked and configured as described herein.

First processor 970 and second processor 980 may be coupled to a chipset 990 via P-P interconnects 962 and 964, respectively. As shown in FIG. 9, chipset 990 includes P-P interfaces 994 and 998. Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920.

Figure 10:
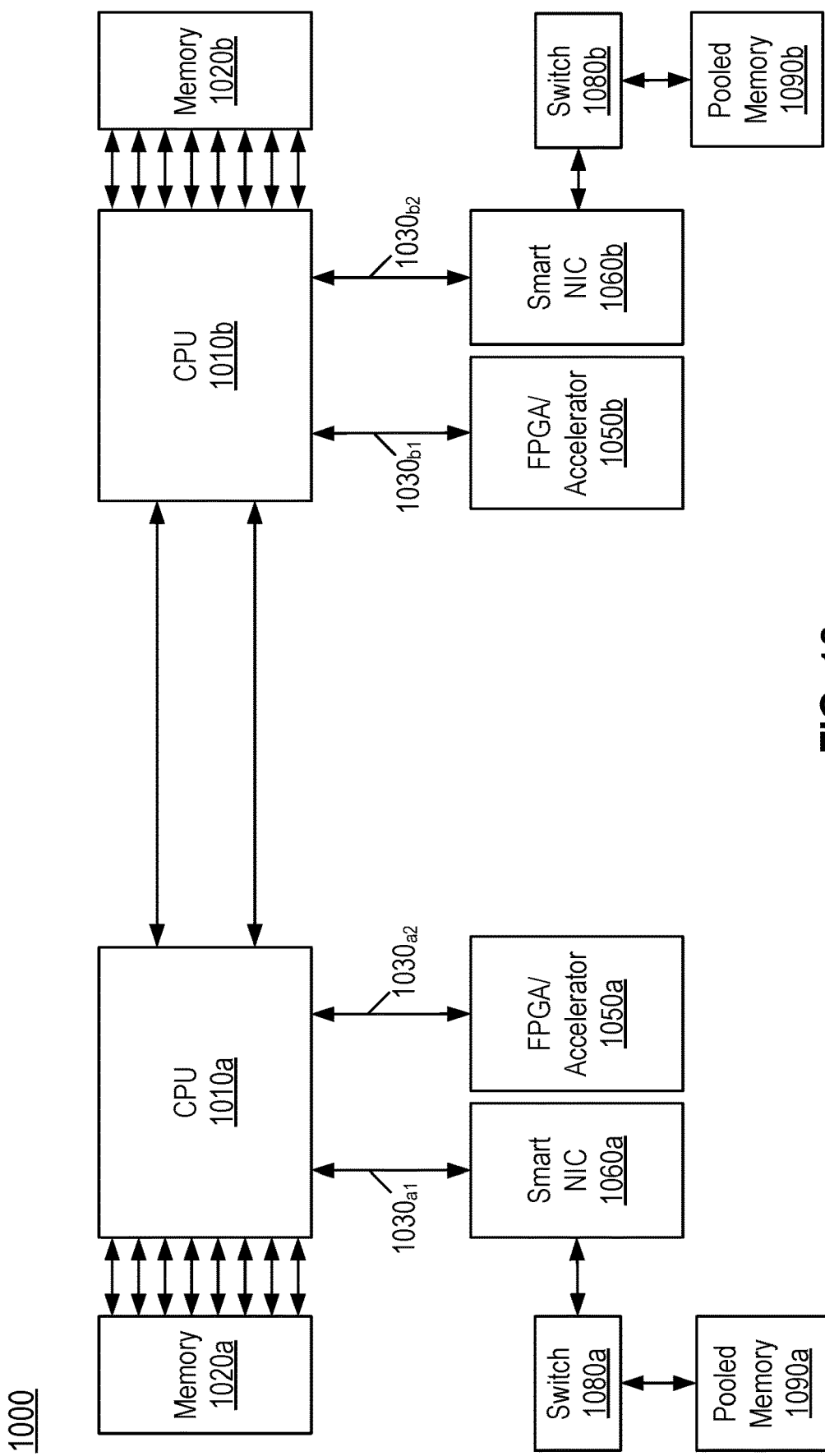
FIG. 10 is a block diagram of a system in accordance with another embodiment.

Referring now to FIG. 10, shown is a block diagram of a system 1000 in accordance with another embodiment. As shown in FIG. 10, system 1000 may be any type of computing device, and in one embodiment may be a datacenter system. In the embodiment of FIG. 10, system 1000 includes multiple CPUs 1010$_{a,b}$ that in turn couple to respective system memories 1020$_{a,b}$ which in embodiments may be implemented as double data rate (DDR) memory, persistent or other types of memory. Note that CPUs 1010 may couple together via an interconnect system 1015 implementing a coherency protocol. In embodiments herein, one or more packages may include multiple dies including at least CPU 1010 and system memory 1020 (e.g.), which may be stacked and configured as described herein.

To enable coherent accelerator devices and/or smart adapter devices to couple to CPUs 1010 by way of potentially multiple communication protocols, a plurality of interconnects 1030$_{a1-b2}$ may be present.

In the embodiment shown, respective CPUs 1010 couple to corresponding field programmable gate arrays (FPGAs)/accelerator devices 1050$a,b$ (which may include GPUs, in one embodiment). In addition CPUs 1010 also couple to smart NIC devices 1060$_{a,b}$. In turn, smart NIC devices 1060$_{a,b}$ couple to switches 1080$_{a,b}$ that in turn couple to a pooled memory 1090$_{a,b}$ such as a persistent memory.

Figure 11:
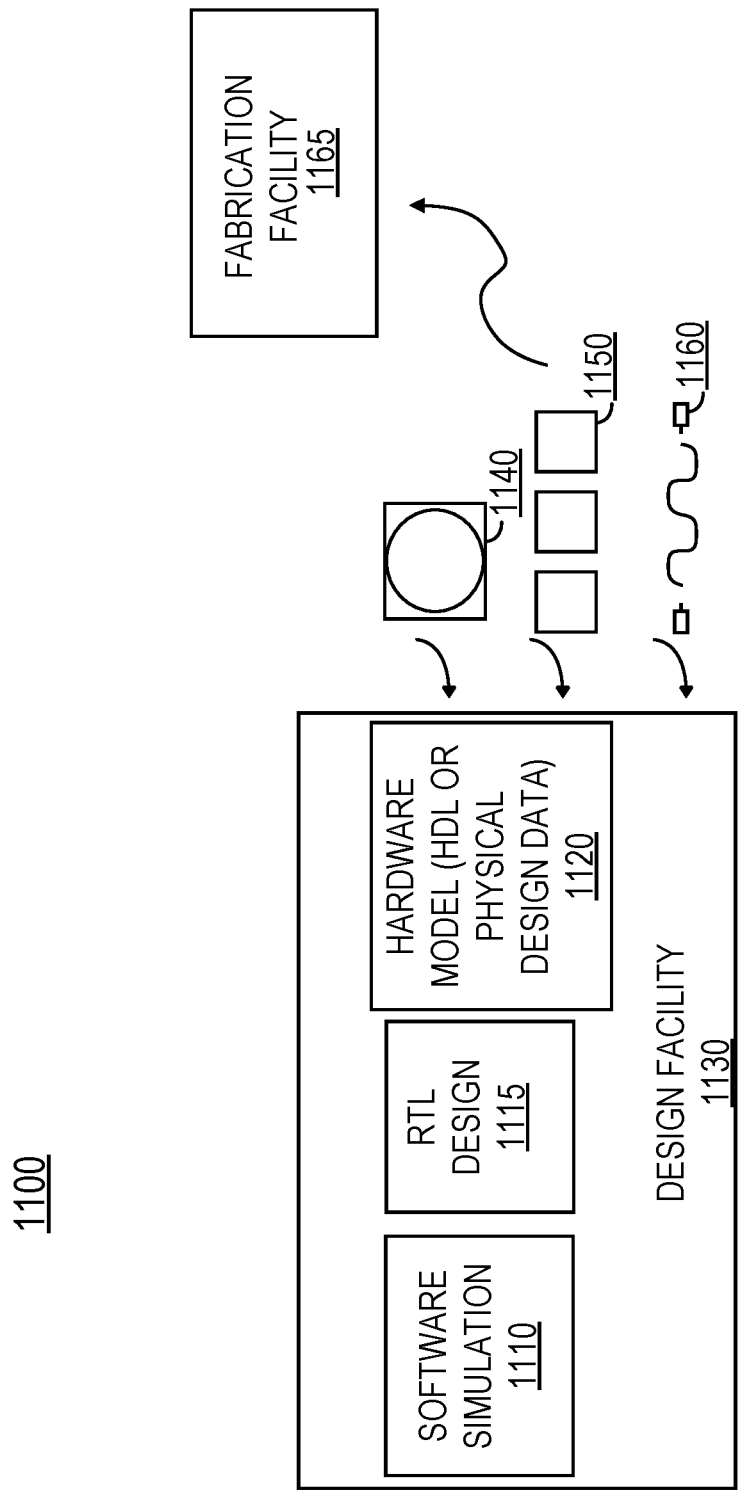
FIG. 11 is a block diagram illustrating an IP core development system used to manufacture an integrated circuit to perform operations according to an embodiment.

FIG. 11 is a block diagram illustrating an IP core development system 1100 that may be used to manufacture integrated circuit dies that can in turn be stacked to realize multi-die packages according to an embodiment. The IP core development system 1100 may be used to generate modular, re-usable designs that can be incorporated into a larger design or used to construct an entire integrated circuit (e.g., an SoC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a third party fabrication facility 1165 using non-volatile memory 1140 (e.g., hard disk, flash memory, or any non-volatile storage medium). Alternately, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to be implemented in a package and perform operations in accordance with at least one embodiment described herein.

The following examples pertain to further embodiments.

In one example, an apparatus comprises: a plurality of banks to store data; and a plurality of interconnects, each of the plurality of interconnects to couple a pair of the plurality of banks, where a first bank of the plurality of banks is to send data directly to a second bank of the plurality of banks via a first interconnect of the plurality of interconnects.

In an example, the apparatus comprises: a first die comprising a memory having the plurality of banks and the plurality of interconnects; and a second die comprising a plurality of execution circuits, the first die in a stacked arrangement with the second die.

In an example, a first execution circuit is positioned in vertical alignment with at least one of the first bank or the second bank.

In an example, the first execution circuit is to receive first input data from the first bank and second input data from the first bank or the second bank and perform an operation on the first input data and the second input data to generate result data, and provide the result data to at least one of the first bank or the second bank.

In an example, the operation comprises a convolution of the first input data and the second input data.

In an example, a second execution circuit is to receive the result data and perform another operation using the result data to generate second result data, and provide the second result data to at least one of the second bank or a third bank, where the second execution circuit is positioned in vertical alignment with at least one of the second bank or the third bank.

In an example, the apparatus further comprises a memory controller coupled to the plurality of banks, where the memory controller, in response to a scatter instruction, is to obtain a plurality of data blocks and provide the plurality of data blocks to at least one of the plurality of banks.

In an example, the memory controller, in response to a gather instruction, is to obtain a second plurality of data blocks from one or more of the plurality of data banks and provide the second plurality of data blocks to a destination.

In an example: the plurality of data blocks comprises image data of an image, where the first bank is to receive a first data block comprising a first portion of the image and the second bank is to receive a second data block comprising a second portion of the image; a first execution circuit associated with the first bank is to perform one or more operations on the first data block; and a second execution circuit associated with the second bank is to perform one or more operations on the second data block.

In an example, the memory controller comprises a distributed memory controller.

In an example, the plurality of interconnects are to communicate using a message passing interface protocol.

In another example, a method comprises: receiving, in a distributed memory controller of a memory, a scatter instruction, the memory comprising a plurality of banks to store data and a plurality of interconnects, each of the plurality of interconnects to couple a pair of the plurality of banks; in response to the scatter instruction, storing a plurality of data blocks in at least some of the plurality of banks; and communicating first data stored in a first bank to a second bank via a first interconnect of the plurality of interconnects.

In an example, the method further comprises receiving, in the distributed memory controller, a gather instruction, and in response to the gather instruction, causing result data stored in one or more of the plurality of banks to be sent to a destination.

In an example, the method further comprises: providing first input data from a first bank to a first processing circuit, the first bank located on a first die and the first processing circuit located on a second die in stacked relation with the first die; and providing second input data from a second bank to the first processing circuit.

In an example, the method further comprises performing at least one operation in the first processing circuit using the first input data and the second input data to obtain first result data, and providing the first result data to at least one of the first bank or the second bank.

In an example, the method further comprises sending the first result data from the first bank to at least a third bank via at least one of the plurality of interconnects using a message passing interface protocol.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a package comprises: a first die comprising a memory having a plurality of banks to store data and a plurality of interconnects to directly couple corresponding pairs of the plurality of banks, where the pairs of the plurality of banks are to directly communicate data therebetween according to a message passing interface protocol; and a second die comprising a plurality of execution circuits, where the first die is coupled to the second die in a stacked arrangement.

In an example, a first execution circuit is in the stacked arrangement with at least one of a first bank or a second bank of the plurality of banks, where the first execution circuit is to receive first input data from the first bank and second input data from the first bank or the second bank, perform an operation on the first input data and the second input data to generate result data, and provide the result data to at least one of the first bank or the second bank.

In an example, the at least one of the first bank or the second bank is to provide at least a portion of the result data to a third bank via one of the plurality of interconnects.

In an example, the package further comprises a memory controller, where the memory controller: in response to a scatter instruction, is to cause a plurality of data blocks to be stored in at least some of the plurality of banks; and in response to a gather instruction, is to cause result data stored in one or more of the plurality of banks to be sent to a destination.

In yet another example, an apparatus comprises: means for receiving a scatter instruction in a memory means comprising a plurality of bank means to store data and a plurality of interconnect means, each of the plurality of interconnect means for coupling a pair of the plurality of bank means, the plurality of interconnect means for communicating using a message passing interface protocol; means for storing a plurality of data blocks in at least some of the plurality of bank means; and means for communicating first data of a first bank means to a second bank means via a first interconnect means using the message passing interface protocol.

In an example, the apparatus further comprises means for receiving a gather instruction, and means for causing result data stored in one or more of the plurality of bank means to be sent to a destination.

In an example, the apparatus further comprises: means for providing first input data from first bank means to first processing means, the first bank means located on a first die and the first processing means located on a second die in stacked relation with the first die; and means for providing second input data from second bank means to the first processing means.

In an example, the apparatus further comprises means for performing at least one operation in the first processing means using the first input data and the second input data to obtain first result data, and means for providing the first result data to at least one of the first bank means or the second bank means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD- ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a plurality of banks to store data; and
a plurality of interconnects, each of the plurality of interconnects to couple a pair of the plurality of banks, wherein a first bank of the plurality of banks is to send data directly to a second bank of the plurality of banks via a first interconnect of the plurality of interconnects.

2. The apparatus of claim 1, wherein the apparatus comprises:
a first die comprising a memory having the plurality of banks and the plurality of interconnects; and
a second die comprising a plurality of execution circuits, the first die in a stacked arrangement with the second die.

3. The apparatus of claim 2, wherein a first execution circuit is positioned in vertical alignment with at least one of the first bank or the second bank.

4. The apparatus of claim 3, wherein the first execution circuit is to receive first input data from the first bank and second input data from the first bank or the second bank and perform an operation on the first input data and the second input data to generate result data, and provide the result data to at least one of the first bank or the second bank.

5. The apparatus of claim 4, wherein the operation comprises a convolution of the first input data and the second input data.

6. The apparatus of claim 4, wherein a second execution circuit is to receive the result data and perform another operation using the result data to generate second result data, and provide the second result data to at least one of the second bank or a third bank, wherein the second execution circuit is positioned in vertical alignment with at least one of the second bank or the third bank.

7. The apparatus of claim 2, further comprising a memory controller coupled to the plurality of banks, wherein the memory controller, in response to a scatter instruction, is to obtain a plurality of data blocks and provide the plurality of data blocks to at least one of the plurality of banks.

8. The apparatus of claim 7, wherein the memory controller, in response to a gather instruction, is to obtain a second plurality of data blocks from one or more of the plurality of data banks and provide the second plurality of data blocks to a destination.

9. The apparatus of claim 7, wherein:
the plurality of data blocks comprises image data of an image, wherein the first bank is to receive a first data block comprising a first portion of the image and the second bank is to receive a second data block comprising a second portion of the image;

a first execution circuit associated with the first bank is to perform one or more operations on the first data block; and
a second execution circuit associated with the second bank is to perform one or more operations on the second data block.

10. The apparatus of claim 7, wherein the memory controller comprises a distributed memory controller.

11. The apparatus of claim 1, wherein the plurality of interconnects are to communicate using a message passing interface protocol.

12. A method comprising:
receiving, in a distributed memory controller of a memory, a scatter instruction, the memory comprising a plurality of banks to store data and a plurality of interconnects, each of the plurality of interconnects to couple a pair of the plurality of banks;
in response to the scatter instruction, storing a plurality of data blocks in at least some of the plurality of banks; and
communicating first data stored in a first bank to a second bank via a first interconnect of the plurality of interconnects.

13. The method of claim 12, further comprising receiving, in the distributed memory controller, a gather instruction, and in response to the gather instruction, causing result data stored in one or more of the plurality of banks to be sent to a destination.

14. The method of claim 12, further comprising:
providing first input data from a first bank to a first processing circuit, the first bank located on a first die and the first processing circuit located on a second die in stacked relation with the first die; and
providing second input data from a second bank to the first processing circuit.

15. The method of claim 14, further comprising performing at least one operation in the first processing circuit using the first input data and the second input data to obtain first result data, and providing the first result data to at least one of the first bank or the second bank.

16. The method of claim 15, further comprising sending the first result data from the first bank to at least a third bank via at least one of the plurality of interconnects using a message passing interface protocol.

17. A package comprising:
a first die comprising a memory having a plurality of banks to store data and a plurality of interconnects to directly couple corresponding pairs of the plurality of banks, wherein the pairs of the plurality of banks are to directly communicate data therebetween according to a message passing interface protocol; and
a second die comprising a plurality of execution circuits, wherein the first die is coupled to the second die in a stacked arrangement.

18. The package of claim 17, wherein a first execution circuit is in the stacked arrangement with at least one of a first bank or a second bank of the plurality of banks, wherein the first execution circuit is to receive first input data from the first bank and second input data from the first bank or the second bank, perform an operation on the first input data and the second input data to generate result data, and provide the result data to at least one of the first bank or the second bank.

19. The package of claim 18, wherein the at least one of the first bank or the second bank is to provide at least a portion of the result data to a third bank via one of the plurality of interconnects.

20. The package of claim 17, further comprising a memory controller, wherein the memory controller:
  in response to a scatter instruction, is to cause a plurality of data blocks to be stored in at least some of the plurality of banks; and
  in response to a gather instruction, is to cause result data stored in one or more of the plurality of banks to be sent to a destination.

\* \* \* \* \*